May 6, 1952  J. VON BERG ET AL  2,595,495
FOCUSING DEVICE
Filed March 2, 1949  3 Sheets-Sheet 1

Inventors
Josef von Berg
Walter Volk
by Karl Michaelis
Attorney

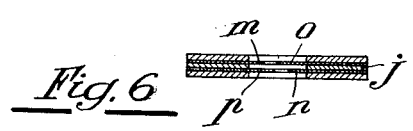
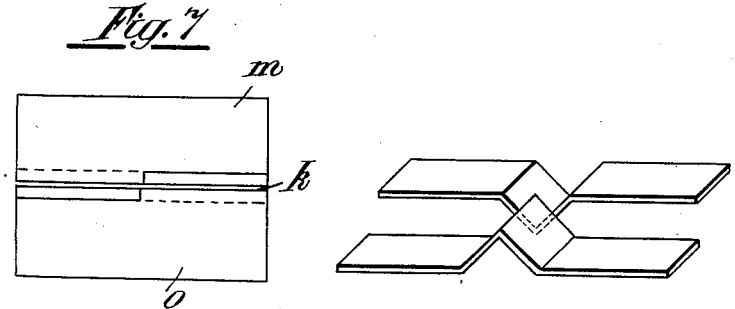
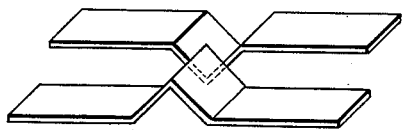
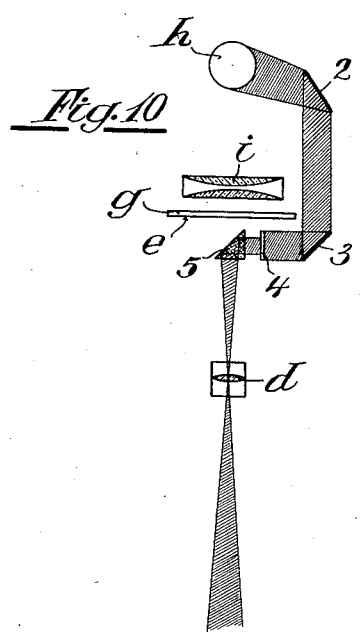
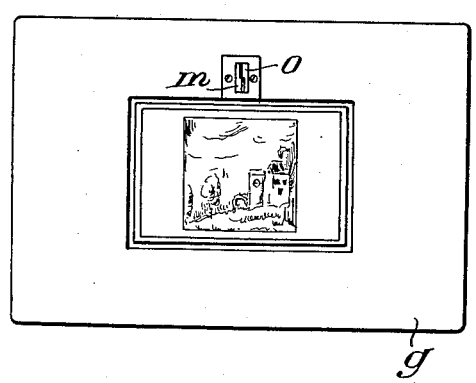

May 6, 1952 J. VON BERG ET AL 2,595,495
FOCUSING DEVICE
Filed March 2, 1949 3 Sheets-Sheet 3

Inventors
Josef von Berg
Walter Volk
by Karl Michaelis
Attorney

Patented May 6, 1952

2,595,495

UNITED STATES PATENT OFFICE 2,595,495

FOCUSING DEVICE

Josef von Berg, Stuttgart-Bad Cannstadt, and
Walter Volk, Stuttgart-Uhlbach, Germany Application March 2, 1949, Serial No. 79,282
In France November 24, 1947

3 Claims. (Cl. 88—24)

This invention relates to photographic devices and instruments, and more particularly to means whereby in these devices, which include enlargers and image projectors, sharp visual focusing can be attained with great ease in a minimum of time.

It is an object of this invention to render sharp focusing widely independent from the capacity for accommodation of the eyes of the user.

It is another object of this invention to provide a focusing system consisting of a few parts of simple configuration.

It is a further object of the invention to provide focusing means the application of which does not require any particular skill on the part of the user.

It is a still further object of the invention to provide a photographic enlarger fitted with focusing means according to this invention which enable the user to obtain sharp and exact focusing in a particularly simple and practical foolproof manner.

As is well known to those skilled in the art, the sharp focusing of photographic enlargers requires considerable skill and experience, mainly because of the gradual change in the sharpness of forms, when the distance of the image (the negative) from the lens of the enlargers is varied, an operation which is required to be gone through in every case. A gradual variation of the sharpness renders it difficult to establish the optimal sharpness, more especially if the eyes of the user have little capacity for accommodation, thus rendering it difficult for him to know whether a lack of sharpness is to be attributed to an incapacity of his eyes or to an inexact adjustment of the instrument. A comparison of the actually visible image with other images obtained with a different adjustment is scarcely possible because the latter images are not visible any more. In many cases lack of sharpness of the image to be enlarged renders it difficult to find out whether the instrument is set correctly or not. Apart therefrom the images which shall be enlarged, frequently lack fine distinct lines which might render it easy to judge of the sharpness of the enlargement.

Many attempts have been made to obviate these difficulties, for instance by first introducing into the enlarger, instead of the negative to be enlarged, a test negative adapted for a recognition of sharpness, and replacing it, after sharp focusing, by the negative to be enlarged. This mode of proceeding takes much time and does not offer an absolute guaranty that the negative to be enlarged assumes exactly the same position in the instrument and therefore possesses the same sharpness as the test negative. Apart therefrom the difficulties of sharp focusing are present in the test negative also.

It has further been proposed to provide the enlarger with special means for an automatic sharp focusing by automatically varying the adjustment of the distance between the image carrier (negative) and the lens by special means in exactly the proportion required as the distance between the lens and the plane on which the enlarged image shall appear in accordance with the desired degree of enlargement. Graduations have been provided on the adjusting devices for the measuring of the two distances, these graduations being so organized that by adjusting both graduations to the same figure, completely sharp focusing was obtained.

With the two methods herebefore described a correct adjustment is obtained only if a lens of a predetermined focal length is used. However frequently a lens must be replaced by another one having a different focal length, and in that case the means for facilitating sharp focusing do not work with the new lens, unless several such devices are provided for alternative use, in which case errors are likely to arise.

Even in lenses of nominally equal focal length differences of the focal length have been observed which render it necessary to adjust and adapt the control elements to each individual case.

According to the present invention, now, all these difficulties are obviated in a comparatively simple manner and a particularly easy, rapid and safe adjustment is rendered possible.

The invention is based in the main on the use of a special focusing device inserted in the path of the light rays passing through the enlarger lens. This device has the form of a diaphragm mounted in or near the plane of the image to be enlarged, and is so shaped as to cause, whenever a slight variation of its distance from the lens occurs, a considerable variation of the geometrical appearance of the image of this object appearing in the plane of projection.

This diaphragm is formed with a narrow slit or gap, the edges of which are spaced differently from the lens. For instance the projection of a straightlined slit, if the slit is too widely spaced from the lens, produces a declination of the projected image towards one, and if it is too near the lens, towards the other side.

In the drawings affixed to this specification and forming part thereof several forms of enlargers, in which the invention is embodied, are illustrated diagrammatically by way of example.

In the drawings:

Fig. 6 is a section through the elements shown in Fig. 2, after they have been assembled.

Fig. 7 is a diagrammatic plan view of Fig. 6.

Figs. 8 and 9 are a front elevation and a perspective view, respectively, of a second embodiment.

Fig. 10 is a diagrammatic illustration of a third embodiment, in which a system of mirrors is used and a focusing device which can be eliminated.

Fig. 11 is a plan view of the embodiment of Fig. 10, showing the location of the focusing device in the image carrier support.

Figure 1:
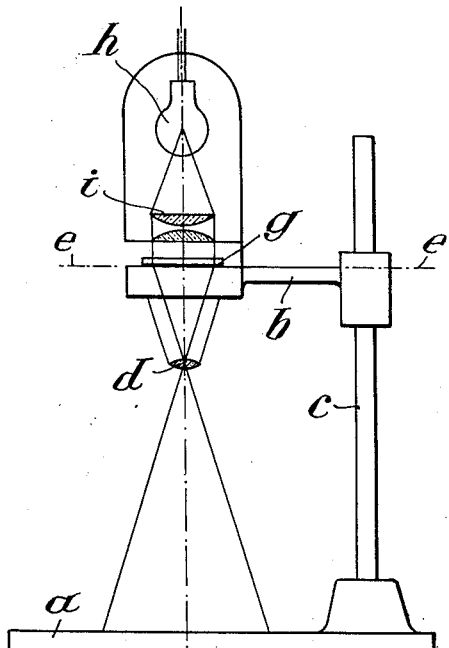
Fig. 1 is an altogether diagrammatic showing of a well known type of enlarger.

Referring to the drawings and first to Fig. 1, the known enlarger here shown consists of a base plate $a$ and an arm $b$ supporting the optical system and being adjustably supported on the column $c$, according to the degree of enlargement desired.

For the purpose of sharp focusing the distance between the lens $d$ and the plane $e$ of the negative to be enlarged can be varied in the optical axis $f$ of the enlarger.

$h$ is a lamp and $i$ a condenser for passing light through the negative lying in a holder $g$ which is removably arranged in the instrument.

According to this invention, a diaphragm is arranged in the plane $e$ of the negative. The nature of this diaphragm can be guessed from Fig. 2. It consists in the main of four plates $m$, $n$, $o$, $p$ which may be of uniform size and configuration. The two plates $m$ and $o$ are situated in a common plane, and so are the plates $n$ and $p$; the arrangement of the two pairs of plates being such that a narrow gap or slit $k$, open at its ends, is formed which extends in the plane $q$. The two pairs of plates $m$—$o$ and $n$—$p$ are spaced from one another as indicated by the reference letter $r$. They are held in spaced relation, for instance by means of spacing members $j$ such as shown in Fig. 6.

The gap $k$ is divided in two sections $s$ and $t$. In the section $s$ the plate $m$ provides one, the plate $n$ the other edge of the gap. Thus the gap edges do not lie on the same level. Similarly in section $t$ the plate $o$ provides one, plate $p$ the other edge.

Figure 2:
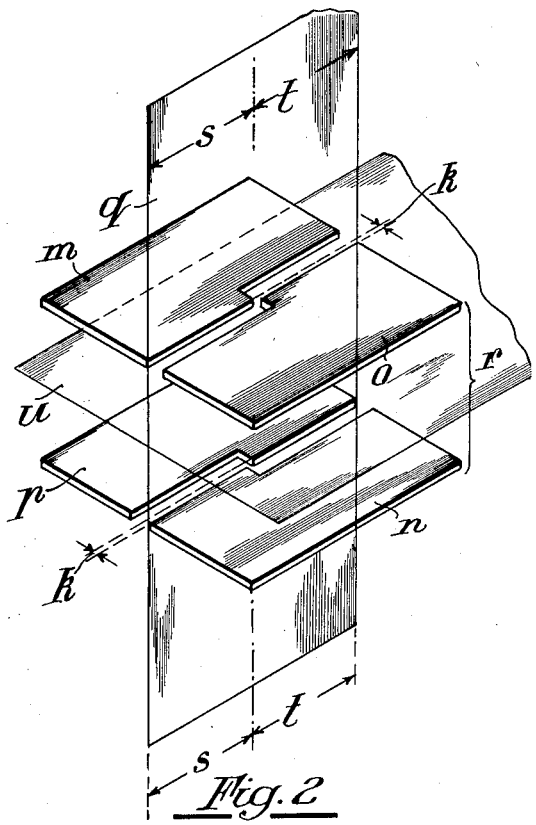
Fig. 2 shows, also in form of a diagram, and greatly enlarged, the main elements of one form of a focusing device according to this invention, which is inserted in the path of the light rays of such an enlarger, the distance between the several elements being exaggerated for the sake of clearness.

The operating position of the diaphragm relative to the plane $e$ of the negative is so chosen that whenever the instrument is sharply focussed, the negative plane $e$ extends in the plane marked $u$ in Fig. 2.

Figure 3:
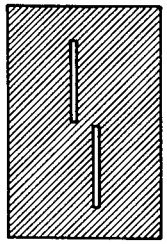
Figs. 3, 4 and 5 illustrate the projection images of the focusing device, as they appear when the distance of the object is too great, too small and is correct, respectively.
Figure 4:
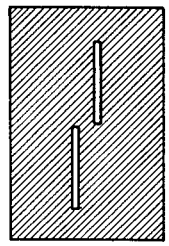

When the diaphragm is mounted in operating position and the optical axis of the instrument extends in the plane $q$, the light rays emitted by the lamp $h$ and passing through the condenser $i$ pass through the gap, mainly along the plane $q$, and are projected as an image of the gap by the lens $d$ onto the ground plate $a$. In connection therewith the surprising phenomenon will be noted, that in case that the diaphragm (Figs. 2, 6 and 7) should not lie in the position at which the desired sharp focus is extant, but lies at a higher level, an image of the gap as shown in Fig. 3 will appear in the plane of projection on the ground plate $a$. On the other hand, if the diaphragm should assume a position at a lower level, wherein it would be closer to the lens $d$, an image of the gap as shown in Fig. 4 will be formed. If now, by suitable adjustment, for instance of the lens $d$, the image of the diaphragm is moved into the exactly correct position relative to the plane $u$ which offers the sharpest focusing, then the two part images of Figs. 3 and 4 move into alignment, as shown in Fig. 5.

Figure 5:
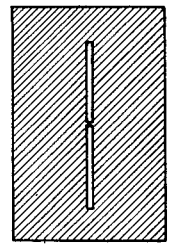

The geometrical image of the diaphragm or rather of its gap thus changes in such definite and significant manner that it becomes easy for anybody to obtain the image according to Fig. 5 and the correct sharp focusing warranted by it, so that, when the negative now takes the place of the diaphragm and its photographic layer lies in the plane $u$, a sharp enlarged reproduction is secured with certainty.

The form of the diaphragm illustrated by way of example in Figs. 2 to 6 is by no means the only possible embodiment of the invention. Its essential parts are the edges of the gap; not the bodies as such between which the gap is formed. The gap $k$, through which the light rays pass, may be formed of more than two sections. The edges need not extend section-wise at different distances from the lens, and in parallel to each other. They may also be convergent, being spaced farther from the lens at one end than at the other, and they may also extend across the plane of the sharpest focusing. According to circumstances the gap image projected onto the image plane will have a shape different from the one shown in Figs. 3–5; it is however important that its appearance vary materially with the slightest variation of the spacing of the object rather than merely to become more or less unsharp.

While it appears useful to mount the diaphragm in the edge of the negative carrier $g$, as shown in Fig. 11, in such a manner that by shifting the negative carrier the diaphragm and, after sharp focusing, the image layer of the negative can be moved into the optical axis, it is preferable to render the diaphragm movable into and out of position independently from the negative holder, so that the negative can remain in the optical axis, while sharp focusing is effected with the help of the diaphragm.

Figure 13:
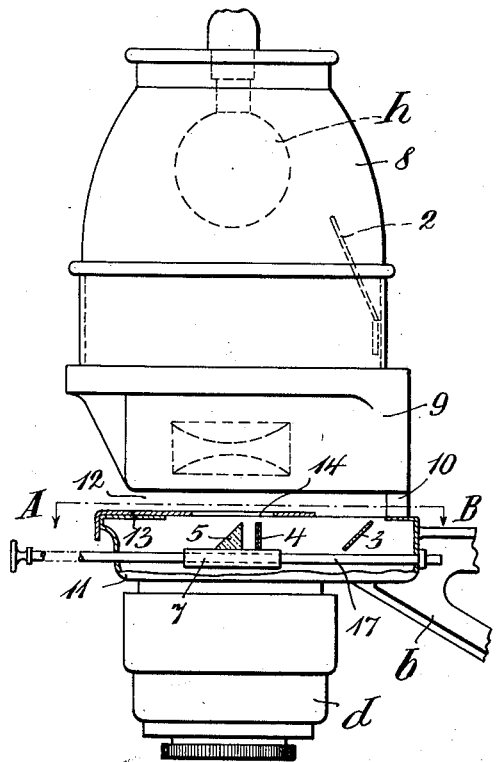
Fig. 13 is a corresponding lateral view, partly in section.

An embodiment of the invention, which renders this possible, is shown in Fig. 10. Here the diaphragm 4 can be shifted for adjustment, together with a prism 5 whose hypothenusal face is used as a mirror, and with a screening slide 7, perpendicularly to the optical axis of the enlarger between two checks in such a manner that for the purpose of sharp focusing the prism 5 can be set in the optical axis as shown in Figs. 10, 13 and 15, the slide 7 serving for screening the bundle of light rays emitted from the light source and passing through the negative in the direction of the optical axis. The slide 7 can be moved so far away from the optical axis that the light can pass freely to the lens. The light to be passed through the mirror system and the test object may be furnished by a separate light source or by the lamp $h$. In the latter case a lateral bundle of light rays may be directed by a mirror 2 outside of the main optical system onto the mirror 3 which is mounted in parallel to the hypothenusal face of the prism 5.

Figure 12:
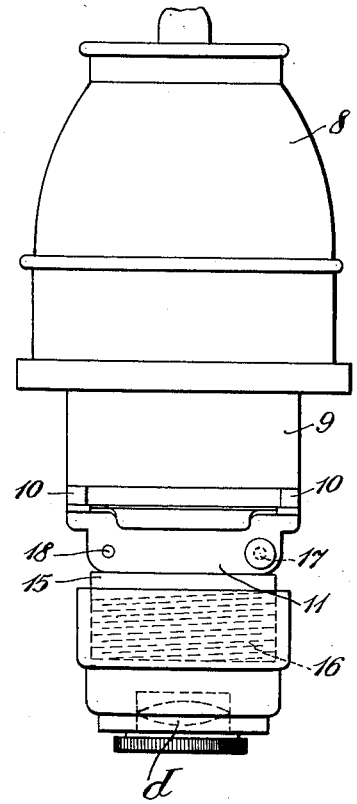
Fig. 12 is a front elevation of an enlarger with a focusing device according to Fig. 10 fitted to it.
Figure 14:
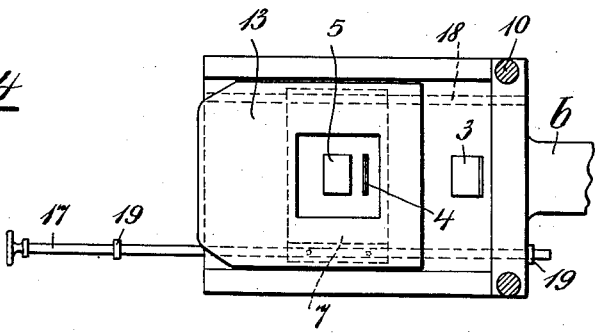
Fig. 14 is a sectional plan view taken on the line A—B in Fig. 13.

Figs. 12-14 illustrate an enlarger fitted with focussing means of the kind disclosed in Fig. 10, which mainly consists of a lamp casing 8 housing besides the lamp $h$ also the mirror 2, while the condenser $i$ is accommodated in the middle part 9. A spacing member 10 connects the lamp casing 8 and the part 9 with a housing 11 in such a manner that a gap 12 is formed into which can be introduced the negative and its carrier. In the gap 12 is located a blind 13 with a passage 14 for the light. The lens $d$ is mounted on its support 15 for adjustment, for instance by means of a screw thread 16.

The slide 7 is fixed to a control rod 17 and its free end rests on a bar 18, whereby the slide can be shifted longitudinally by means of the rod 17 in the housing 11 and together with the prism 5 and the test object can be moved into and out of operation position. Checks 19 on the rod 17 serve for defining the end positions. Figs. 10, 13 and 15 shown the adjustment, for the purpose of sharp focusing, of the prism 5 in the optical axis. In this case the bundle of light rays emitted by the light source $h$ cannot directly reach the lens $d$, the slide 7 being in the way. However, when the rod 17 is moved towards the right, the prism 5 and the diaphragm move to the right and, together with the slide 7, away from the optical axis.

The path traveled by the rays between the center of the diaphragm gap through to the prism 5 and the lens center must be exactly as long as the path between the plane $e$ and the lens center.

While in the foregoing the invention has been described only in connection with photographic enlargers, it is obvious that it can also be used with advantage in projection apparatus of any well known type, including still and moving picture projectors.

It is further applicable to photographic cameras, provided the diaphragm is arranged, together with a light source sending light rays through its gap, in the plane designed to subsequently house the light-sensitive layer (plate, film and the like).

In projectors the arrangement and operation of the sharp focusing device according to this invention becomes particularly simple, if the diaphragm is arranged in the negative carrier or the support for the picture to be projected, in the case of removably guided negative carriers in a border portion of the carrier in a position such that the gap of the diaphragm intersects the optical axis of the projection. However the most useful arrangement, from a practical point of view, is that shown in Figs. 10, 12, 13 and 14.

We wish it to be understood that we do not desire to be limited to the details of construction shown and described, for obvious modifications will occur to a person skilled in the art.

We claim:

1. In optical apparatus in combination, a device for focusing said apparatus comprising an optical system, an objective and a light source forming part of said system, diaphragm means extending across the optical axis of the system between said light source and objective, and including a first portion extending transversely to said axis and having an edge adjacent said axis, a second portion extending transversely to said axis and having an edge in opposition to said first portion edge, said second portion being spaced from said first portion both transversely and longitudinally with respect to said axis so that said edges are similarly spaced and define a light gap angularly disposed with respect to said axis, a third portion extending transversely to said axis and on the opposite side of said axis relative to said first portion and having an edge adjacent said axis, a fourth portion extending transversely to said axis and on the opposite side of said axis relative to said second portion and having an edge in opposition to said third portion edge, said fourth portion being spaced from said third portion both transversely and longitudinally with respect to said axis so that the edges corresponding thereto are similarly spaced and define a second light gap angularly disposed with respect to said axis, said third and fourth portions being so positioned with regard to each other and said first and second portions that the angular disposition of said second light gap is opposite the angular disposition of said first light gap whereby a pair of images is produced corresponding to said first and second light gaps which are in alignment at proper focus distance and are geometrically displaced to nonaligned positions characteristic of distances longer and shorter than proper focus distances.

2. The optical apparatus of claim 1 wherein the diaphragm means comprises four plate-like members, a first pair of said members being spaced from one another and located in a common plane and a second pair of said members being spaced from one another and located in a second common plane spaced along said optical axis relative to the plane of said first pair and wherein said first and third portions form a part of said first pair of members and said second and fourth portions form a part of said second pair of members.

3. The optical apparatus of claim 1 wherein a right angle prism is provided between said objective and said diaphragm means so as to provide an alternate non-linear optical axis and wherein said diaphragm means is positioned across said alternate axis in functionally identical relation to the objective as an object positioned in the focal plane along a straight line axis between said light source and objective and wherein means are provided for simultaneously bringing said object and diaphragm means into focus.

JOSEF VON BERG.
WALTER VOLK.

REFERENCES CITED

The following references are of record in the file of this patent:

UNITED STATES PATENTS

| Number | Name | Date |
| --- | --- | --- |
| 728,584 | Dickson | May 19, 1903 |
| 2,286,471 | Dahl | June 16, 1942 |